United States Patent
Huang

(10) Patent No.: US 7,192,159 B2
(45) Date of Patent: Mar. 20, 2007

(54) BACKLIGHT MODULE HAVING A TRUSS TYPE STRUCTURE

(75) Inventor: Chi-Jen Huang, Tao-Yuan Hsien (TW)

(73) Assignee: Hannstar Display Corporation (TW)

( * ) Notice: Subject to any disclaimer, the term of this patent is extended or adjusted under 35 U.S.C. 154(b) by 34 days.

(21) Appl. No.: 11/067,118

(22) Filed: Feb. 25, 2005

(65) Prior Publication Data

US 2006/0193120 A1    Aug. 31, 2006

(51) Int. Cl.
*F21V 33/00*    (2006.01)
(52) U.S. Cl. .................. 362/225; 362/223; 362/224; 362/249; 362/235
(58) Field of Classification Search ............... 362/561, 362/560, 332, 333, 334, 632, 225, 223, 222, 362/224, 249, 235
See application file for complete search history.

(56) References Cited

U.S. PATENT DOCUMENTS

| | | | | |
|---|---|---|---|---|
| 6,491,411 B2* | 12/2002 | Itoh | ............................ | 362/246 |
| 6,857,759 B2* | 2/2005 | Lee et al. | .................... | 362/225 |
| 6,880,953 B2* | 4/2005 | Shin | ............................ | 362/225 |
| 6,997,582 B2* | 2/2006 | Yang et al. | .................. | 362/373 |

* cited by examiner

*Primary Examiner*—Laura K. Tso
(74) *Attorney, Agent, or Firm*—Venable LLP; Raymond J. Ho

(57) ABSTRACT

A backlight module having a truss type structure comprises a plurality of truss type members, a reflector and at least a light source. The truss members and the light source positioned on the truss type structure. In a liquid crystal display (LCD) panel, the truss type structure disclosed in this invention is used as a main structure of such backlight module. Compared to those of the prior art, backlight modules that utilize the truss type structure of this invention have the advantages of reduced weight and better bending strength.

20 Claims, 7 Drawing Sheets

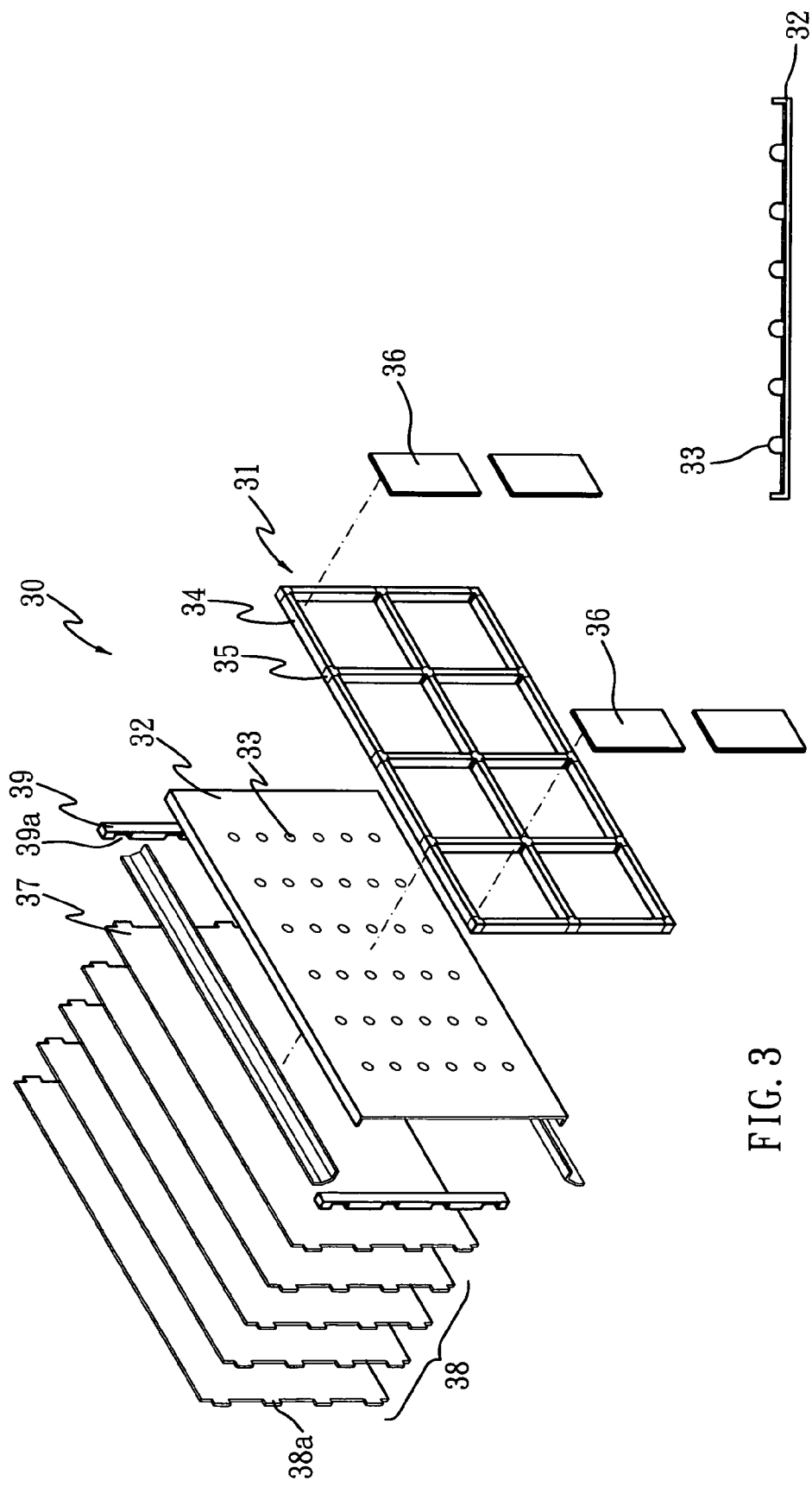

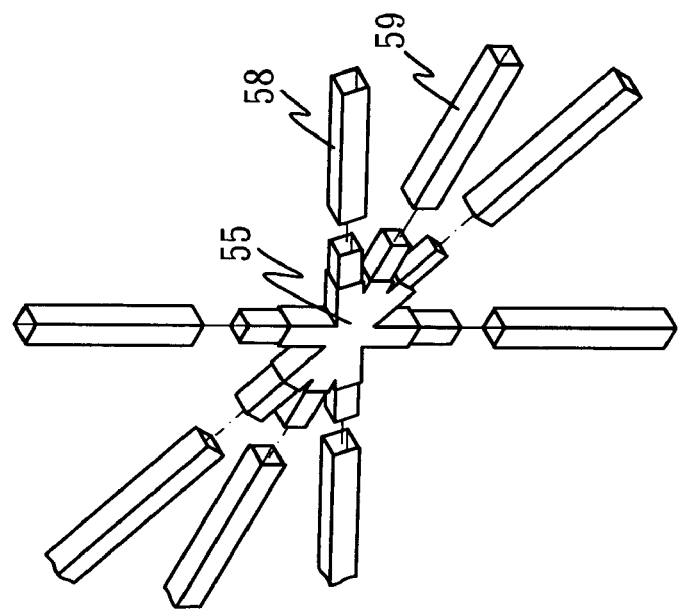
FIG. 5C
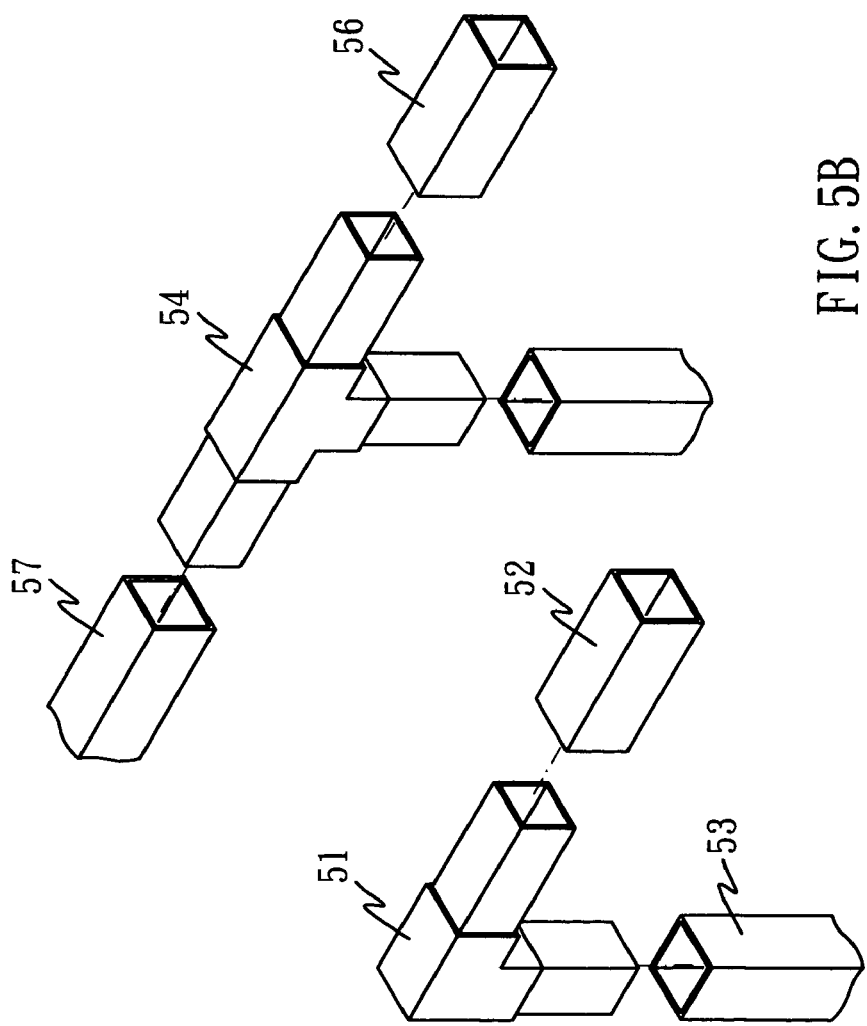
FIG. 5B
FIG. 5A

BACKLIGHT MODULE HAVING A TRUSS TYPE STRUCTURE

BACKGROUND OF THE INVENTION

1. Field of the Invention

The present invention relates to a backlight module, particularly one with a truss type structure.

2. Description of the Related Art

Liquid crystal display (LCD) TV has long become the mainstream of the market, and as a result, the sizes thereof are being made larger and larger. FIG. 1 shows a conventional backlight module used in an LCD panel. The backlight module 10 comprises a back cover 11, a reflector 12, a plurality of light sources 13, a plurality of optical films 16, a diffuser plate 14, and a front cover 15. The back cover 11, which provides most mechanical strength for the backlight module 10, is made of a metal such as aluminum or zinc-plated sheet steel (SECC). As the LCD panels are made larger, the back cover 11 and tooling therefor also have to be made larger and cost therefor is absolutely increased. In this case, the current manufacturing and equipment capability may not necessarily deal well with the newly introduced requirements. In addition, the increased dimension of the back cover 11 also means that the LCD panel (not shown) will become more weighted and the back cover 11 will suffer from the problem of insufficient bending strength.

In this regard, a reinforcing rib or a reinforcing plate (not shown) is generally suggested to increase the insufficient bending strength. However, mold cost is in this case further increased and such mold is in fact not easy to be fabricated. Moreover, the more weighted of such backlight module also imposes difficulties on transportation thereof and assembly therefor. In this case, further equipment has to be furnished and a further cost is required. Moreover, the weighty backlight module has to be charged with a pricy shipment cost.

Therefore, how to reduce the weight of an LCD backlight module without sacrificing its bending strength is an important issue for all LCD manufacturers.

SUMMARY OF THE INVENTION

It is an object of the present invention to provide an LCD backlight module with reduced weight and better bending strength.

The LCD backlight module with a truss type structure, designed in line with the spirit of the present invention, comprises a plurality of truss members, a reflector and at least a light source disposed on the truss type structure, respectively. As compared to the prior art, the truss type structure is used as a main structure of the backlight module so that the weight thereof is reduced while at the same time the bending strength thereof is enhanced.

With the backlight module according to the present invention, the following advantages may be achieved: (1) only one-second of weight is required for the truss type structure as compared to the prior truss structure of same size. (2) No additional mold has to be furnished and thus mold cost and mold development time for the truss type structure may be saved. (3) The manufacturing of the truss type structure may be conducted by means of the current equipment on the current production line. (4) The material cost and development cost for the truss type structure itself are inexpensive. (5) Inventory cost and shipment expenses are reduced owing to the slighter truss type structure. (6) Only a lower assembly cost is required since the assembly for the truss type structure is simple. (7) The bending strength is efficiently enhanced as compared to a prior truss type structure of same size and the warpage is well improved. (8) The truss type structure is easy to be fastened and assembled and thus no additional support or supporting means is required.

BRIEF DESCRIPTION OF THE DRAWINGS

The invention can be more fully understood from the detailed description given below, the drawings and embodiments are not limitative of the right scope of the present invention, and wherein:

FIG. 3 shows the backlight module having the truss type structure according to the second embodiment of the present invention;

FIG. 3A is a partial view of the truss type structure equipped backlight module;

FIGS. 5A to 5C are detailed diagrams of the connectors of the truss type structures of the present invention.

DESCRIPTION OF THE PREFERRED EMBODIMENT

Figure 1:
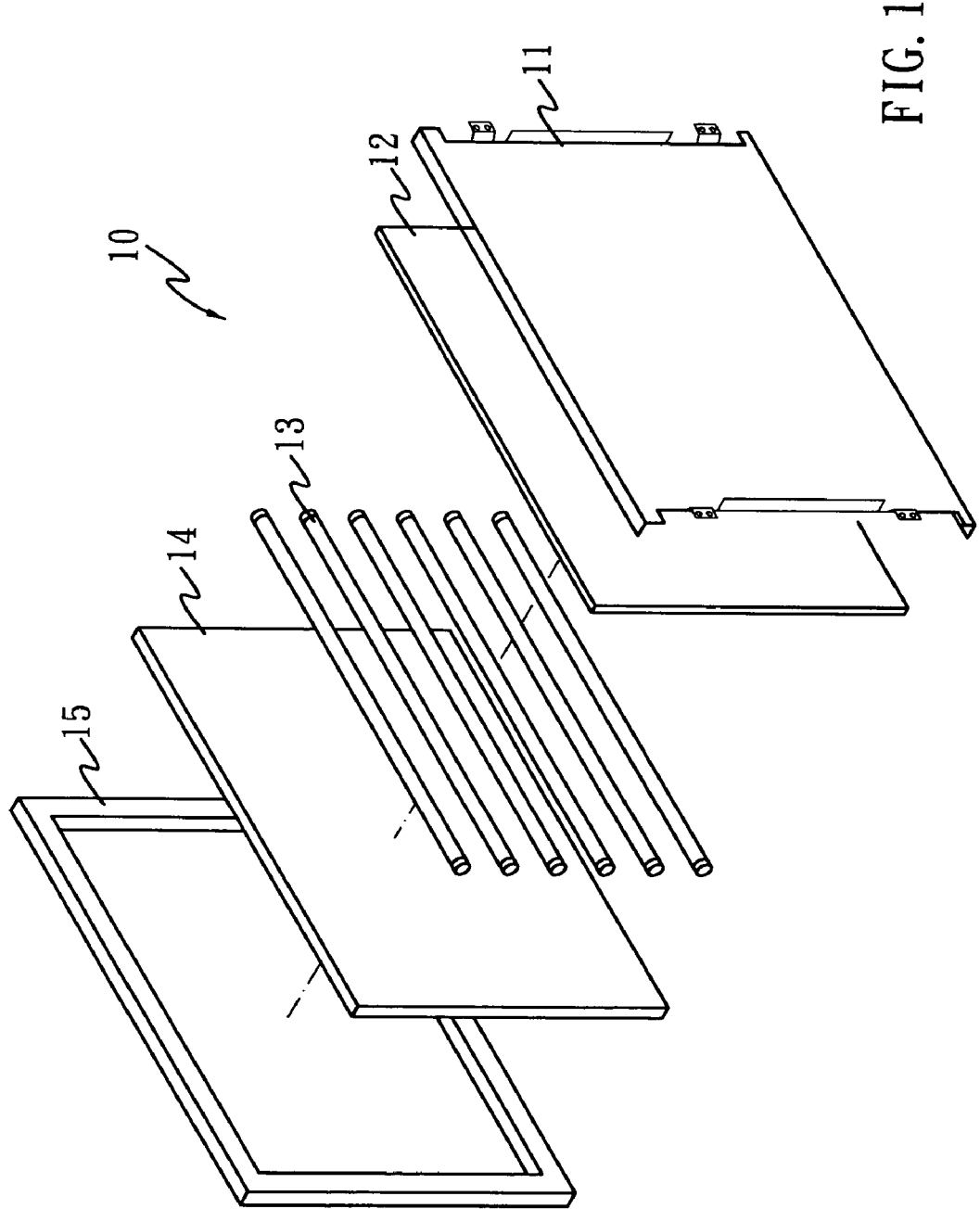
FIG. 1 shows a conventional backlight module used in an LCD.
Figure 2:
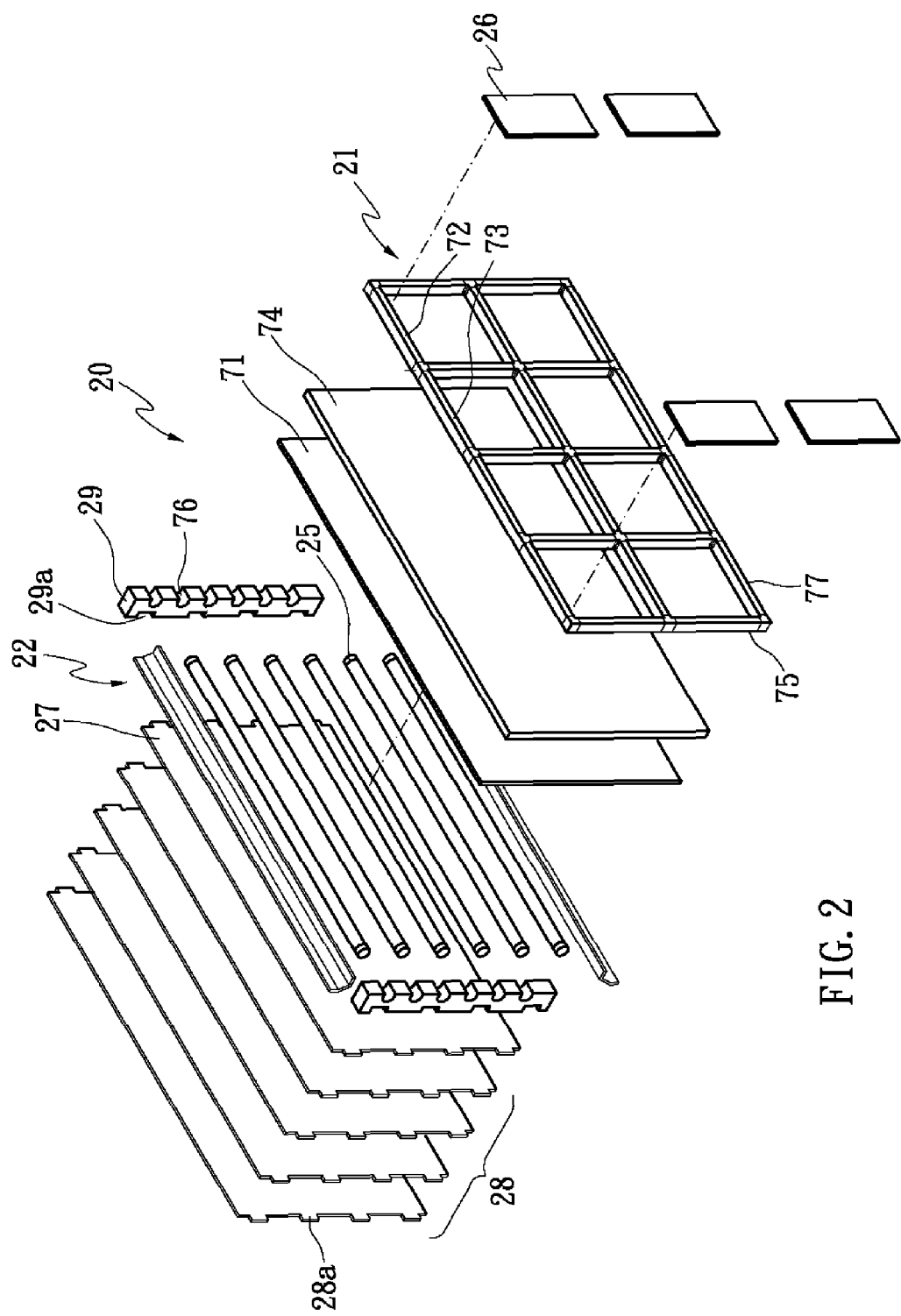
FIG. 2 shows a backlight module having a truss type structure according to the first embodiment of the present invention.
Figure 4B:
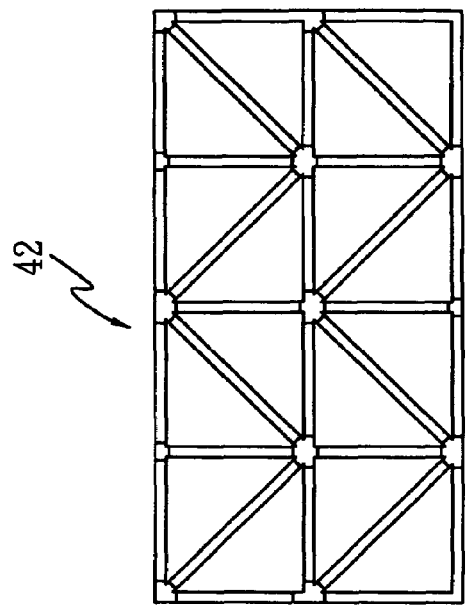
FIGS. 4A to 4D are detailed diagrams of the truss type structures of the present invention.
Figure 4D:
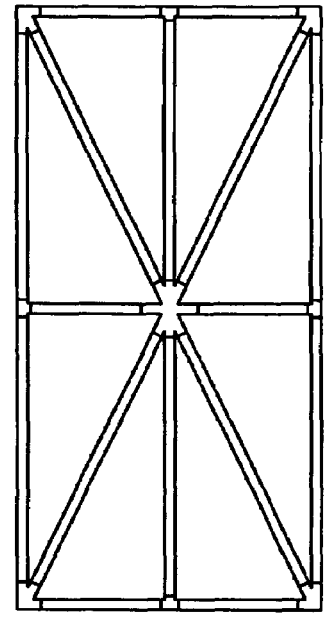
Figure 4A:
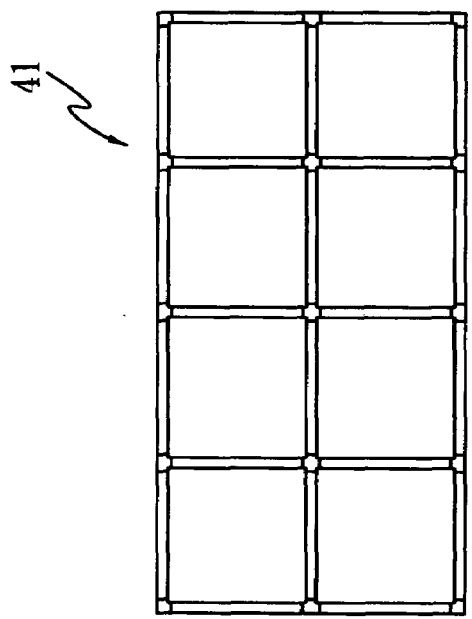
Figure 4C:
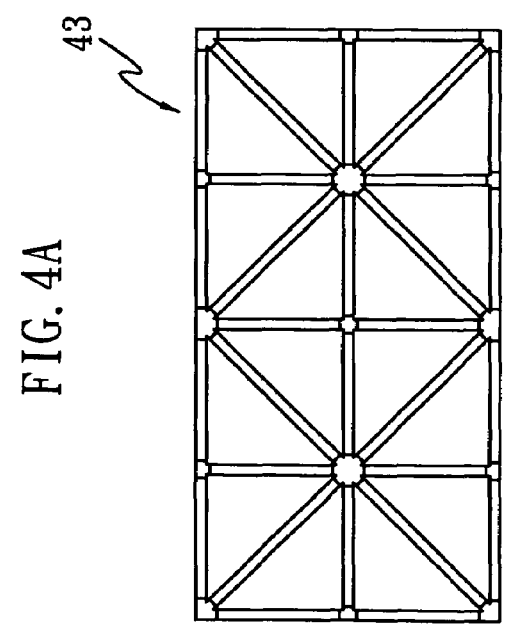
Figure 6C:
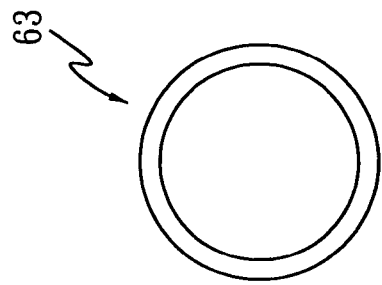
FIGS. 6A to 6H are cross section views of the truss members of the embodiments of the present invention.
Figure 6F:
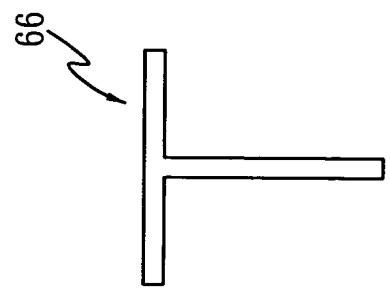
Figure 6B:
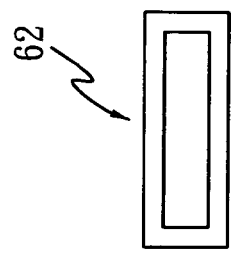
Figure 6E:
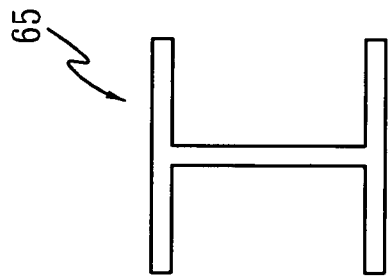
Figure 6A:
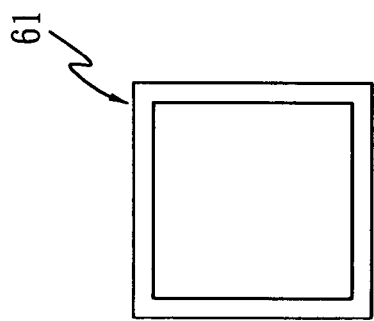
Figure 6D:
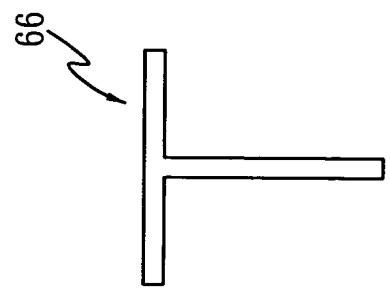
Figure 6H:
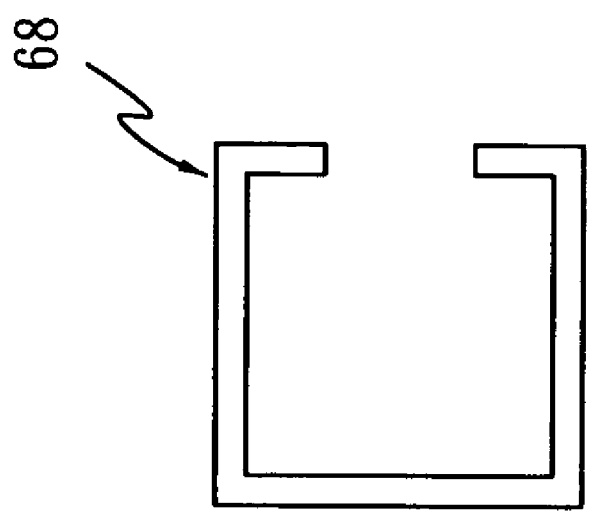
Figure 6G:
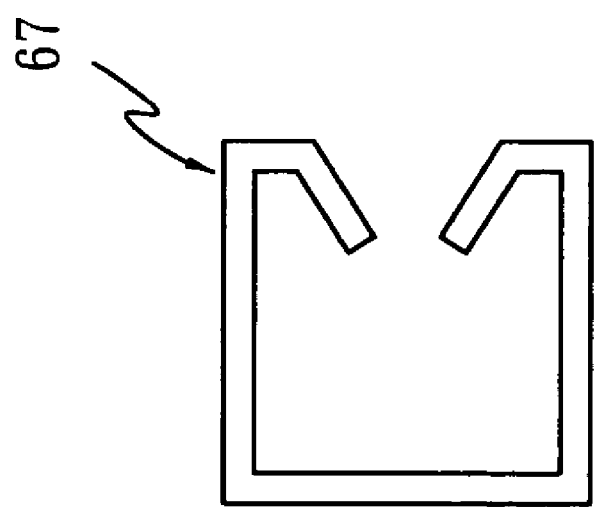

Referring to FIG. 2, a backlight module 20 having a truss type structure according to the first embodiment of the present invention. The backlight module 20 comprises a truss type structure 21, a reflector 71 and a plurality of light sources 22. In the backlight module 20, the truss type structure 21 comprises a plurality of truss members, which are used to provide required mechanical strength for the backlight module 20. A first truss member 72 and a second truss member 73 of the truss type structure 21 can be jointed with each other through welding, interlocking, screwing, bonding, or any other means considered suitable.

Preferably, the first truss member 72 and the second truss member 73 are jointed by a connector 24. In other words, the connectors connect the adjacent truss members. The reflector 71 is disposed on the truss type structure 21 and used to reflect a light emitted from the light sources 22. In this embodiment, the reflector 71 can be made of polycarbonate (PC) or polyethylene terephthalate (PET).

The light sources 22 are positioned on the truss structure 21, and may be a point light source, a linear light source or a flat light source. In this embodiment, a plurality of cold cathode fluorescent lamps (CCFLs) are evenly (i.e., with equal space in between) distributed on the truss type structure 21 and the light sources 22 are secured on the truss type structure 21. In this embodiment, a plate 74 may be further provided between the reflector 71 and a first side 75 of the truss type structure 21 for leveling or supporting the reflector 71.

The diffuser plate 27 is provided to diffuse evenly the light emitting from the light sources 22. A plurality of optical films 28 (e.g., a polarizing film or a prism film) are each provided with a plurality of protrusions 28a. Such protrusions 28a can also be provided on the diffuser plate 27. The backlight module 20 further comprises a plurality of side walls 29. The side walls 29 are disposed on the first side 75 of the truss type structure and have a plurality of light source holders 76 for securing the light source 22 on the first side 75 of the truss type structure 21.

In this embodiment, ends 25 of the light sources 22 are secured by the light source holders 76. The protrusions 28a can fit on recesses 29a of the side walls 29 in such a manner that the optical film 28 and the diffuser 27 can be provided at the side walls 29. The side walls 29 is made of a metal or plastic and may be fixed to the truss type structure 21 by interlocking or screwing.

A plurality of second printed circuit boards (PCBs) 26 can include a control system board, an inverter board, or a power supply board. The second PCBs 26 are fixed on the truss type structure 21 and can alternatively be disposed on an external side or a second side 77 of the back light module 20.

FIG. 3, illustrates a second preferred embodiment of the backlight module 30 having the truss type structure according to the spirit of the present invention. The backlight module 30 comprises a truss type structure 31, a first printed circuit board (PCB) 32 and a plurality of light sources 33.

The truss type structure 31 comprises a plurality of truss members 34 jointed through a plurality of connectors 35; and used to provide mechanical strength for the backlight module 30. Furthermore, the first PCB 32 may have a reflective material coated on a surface as a reflector to reflect light like that functioned by a conventional reflector. The light sources 33 are electrically mounted on the first PCB 32 and disposed on the reflector surface. A diffuser plate 37 is provided to diffuse the light emitted from the light sources 33.

A plurality of optical films 38 (e.g., a polarizing film or a prism film) is provided with a plurality of protrusions 38a. Such protrusions 38a can also be provided on the diffuser plate 37. The backlight module 30 further comprises a plurality of side walls 39. The protrusions 38a can fit on recesses 39a of the side walls 39 in such a manner that the optical film 38 and the diffuser plate 37 may be provided in the backlight module 39. The side walls 39 is made of a metal or plastic and can be fixed to the truss type structure 31 by interlocking or screwing.

Referring to FIG. 3A, a partial view of the truss type structure equipped backlight module. As shown, the light sources 33 are disposed on the first PCB 32 and can be a point light source, such as a white light-emitting diode (LED). The diffuser plate 37 can diffuse the light emitted from the light sources 33 and thus form an evenly distributed flat light source.

In this embodiment, the first PCB 32 can be a reflector made of PC or PET. The light sources 33, which can comprises a plurality of LEDs, are positioned on the reflector.

A plurality of second PCBs 36 can include a control system board, an inverter board, or a power supply board. The second PCBs 36 are fixed on the truss type structure 31.

FIG. 4A through FIG. 4D are detailed diagrams of the truss type structures of the present invention in which the first, second, third and fourth fundamental type truss structures are shown respectively. As shown in these figures, each of the truss type structures 41, 42, 43, 44 is obtained by connecting a plurality of truss members through a plurality of connectors. With backlight modules having a diagonal dimension of 30 to 50 inches, the first and fourth type truss structures 41, 44 are preferred. On the other hand, with backlight modules having a diagonal dimension greater than 50 inches, the second and third type truss structures 42, 43 are preferred.

FIG. 5A through 5C are detailed diagrams of the connectors used in the truss type structures of the present invention.

As shown in these figures, an L-shaped two way connector 51 is used to connect the first truss member 52 and the second truss member 53. The angle between the first truss member 52 and the second truss member 53 is 90 degree. An T-shaped three-way connector 54 and an multi-way connector 55 are used to connect three and eight truss members respectively, wherein the angle between the third truss member 56 and the fourth truss member 57 is 180 degree and the angle between the fifth truss member 58 and the sixth truss member 59 is 30 degree. The angle between two adjacent truss members is from 30 degrees to 180 degrees. The shape of connectors is based on that of the truss members. The truss members and the connectors can be made of plastic, SECC, Al, Mg and Ti and the truss members can be alternatively made of paper.

FIG. 6A to FIG. 6F show cross sectional views of the truss members of the truss type structures according to the present invention. The truss members can be solid truss members or hollow truss members of three-dimensional structure. In the case of the truss members, lines or wires required for the backlight module can run through them. The hollow truss members can be a square shape 61, a rectangular shape 62, a circular shape 63, an L shape 64, an I shape 65, a T shape 66, a B shape 67, a C shape 68 or other alphabet letter shape cross section structure, wherein from the L shape 64 to C shape 68 and the alphabet letters shaped are called letter-shaped cross section structure. As an example, with a 50-inch backlight module, zinc-plated steel sheet (SECC) will be chosen as the material of the truss members and the connectors, while the first type truss structure with truss members having square-shaped cross sections will be chosen to go with the module. Compared with that of conventional back coverd modules, the weight of a the truss-structured backlight module is up to at least 50% lighter, while its bending strength is more than doubled.

Also contemplated in the present invention, sectional structure of the truss members may vary with the strength requirements of the backlight module. Further, area and type of the sectional structure of the truss members can be different in the truss type structure. For instance, the truss members further comprise a plurality of main truss members and a plurality of secondary truss member. The main truss member can have a sectional shape having a greater moment of inertia while the secondary truss member may have a sectional shape having a smaller moment of inertia so as to reduce the weight of the truss type structure.

As is understood by a person skilled in the art, the foregoing preferred embodiment of the present invention is an illustration, rather than a limiting description, of the present invention. It is intended to cover various modifications and similar arrangements included within the spirit and scope of the appended claims, the scope of which should be accorded the broadest interpretation so as to encompass all such modifications and similar structures.

What is claimed is:

1. A backlight module, comprising:
   a truss type structure including a plurality of truss members;
   a reflector disposed on a first side of said truss type structure; and
   a light source disposed on said reflector.

2. The backlight module according to claim 1, wherein said truss members are jointed by a method selected from the group consisting of welding, bonding, interlocking and screwing.

3. The backlight module according to claim 1, wherein said truss type structure further comprises a plurality of connectors which connect said adjacent truss members.

4. The backlight module according to claim 1, wherein one of said truss members is a three-dimensional structure.

5. The backlight module according to claim 1, wherein one of said truss members is a hollow structure.

6. The backlight module according to claim 1, wherein said truss members are made of metal, plastic or paper.

7. The backlight module according to claim 1, wherein said truss members are made of zinc-plated sheet steel, Al, Mg or Ti.

8. The backlight module according to claim 1, wherein said truss members includes a square shaped, a rectangular shaped, a circular shaped, or a letter-shaped cross section structure.

9. The backlight module according to claim 1, wherein an angle formed by said adjacent truss members falls in the range between 30 degrees and 180 degrees.

10. The backlight module according to claim 1, wherein said truss members have different moment of inertia.

11. The backlight module according to claim 1, wherein said light source includes a point light source, a linear light source or a flat light source.

12. The backlight module according to claim 1, wherein said light source is secured to said truss type structure.

13. The backlight module according to claim 1, further comprising a plate disposed between said reflector and said first side of said truss type structure.

14. The backlight module according to claim 13, wherein said plate is a first printed circuit board.

15. The backlight module according to claim 1, further comprising a side wall disposed on said first side of said truss type structure.

16. The backlight module according to claim 15, wherein said side wall further comprises a plurality of light source holders, and said light source is secured by said light source holders on said first side of said truss type structure.

17. The backlight module according to claim 15, wherein said side wall further comprises a plurality of recesses.

18. The backlight module according to claim 17, further comprising a plurality of optical films with a plurality of protrusions disposed on the recesses of said side walls.

19. The backlight module according to claim 1, further comprising a plurality of second printed circuit boards disposed on a second side of said truss type structure.

20. The backlight module according to claim 19, wherein said second printed circuit boards include a control system board, an inverter board, or a power supply board.

* * * * *